United States Patent
Qiao et al.

(10) Patent No.: US 10,122,783 B2
(45) Date of Patent: Nov. 6, 2018

(54) DYNAMIC DATA-INGESTION PIPELINE

(71) Applicant: LinkedIn Corporation, Mountain View, CA (US)

(72) Inventors: Lin Qiao, San Jose, CA (US); Yinan Li, Los Gatos, CA (US); Sahil Takiar, San Francisco, CA (US); Ziyang Liu, San Mateo, CA (US); Narasimha R. Veeramreddy, San Jose, CA (US); Min Tu, Cupertino, CA (US); Ying Dai, Mountain View, CA (US); Issac Buenrostro, Sunnyvale, CA (US); Kapil L. Surlaker, Sunnyvale, CA (US); Shirshanka Das, San Jose, CA (US); Chavdar Botev, Sunnyvale, CA (US); Kenneth D. Goodhope, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 329 days.

(21) Appl. No.: 14/944,934

(22) Filed: Nov. 18, 2015

(65) Prior Publication Data

US 2017/0139956 A1    May 18, 2017

(51) Int. Cl.
*G06F 17/00* (2006.01)
*G06F 17/30* (2006.01)
*H04L 29/08* (2006.01)

(52) U.S. Cl.
CPC ......... *H04L 67/02* (2013.01); *G06F 17/3007* (2013.01)

(58) Field of Classification Search
CPC .............................. G06F 17/3007; H04L 67/02
See application file for complete search history.

(56) References Cited

PUBLICATIONS

Tantisiriroj et al., "On the Duality of Data-intesive File System Design: Reconciling HDFS and PVFS", SC11, Nov. 12-18, 2011, Seattle, Washington, Copyright 2011, ACM, pp. 1-12.*
Wang et al., "Hadoop High Availability through Metadata Replication", CloudDB'09, Nov. 2, 2009, Hong Kong, China, Copyright 2009 ACM, pp. 37-44.*

(Continued)

*Primary Examiner* — Cheryl Lewis
(74) *Attorney, Agent, or Firm* — Park, Vaughan, Fleming & Dowler LLP (57) ABSTRACT

In order to ingest data from an arbitrary source in a set of sources, a computer system accesses predefined configuration instructions. Then, the computer system generates a dynamic data-ingestion pipeline that is compatible with a Hadoop file system based on the predefined configuration instructions. This dynamic data-ingestion pipeline includes a modular arrangement of operators from a set of operators that includes: an extraction operator for extracting the data of interest from the source, a converter operator for transforming the data, and a quality-checker operator for checking the transformed data. Moreover, the computer system receives the data from the source. Next, the computer system processes the data using the dynamic data-ingestion pipeline as the data is received without storing the data in memory for the purpose of subsequent ingestion processing.

20 Claims, 6 Drawing Sheets

(56) References Cited

PUBLICATIONS

Qiao et al: "Unifying data ingestion for Hadoop" Proceedings of the 41st International Conference on Very Large Data Bases. Kohala Coast, HI, USA. Aug. 31-Sep. 4, 2015. pp. 1764-1769. vol. 8. www.vlbd.org/pvldb/vol8/p1764-qiao.pdf. Downloaded on Dec. 27, 2016.

Qiao: "Gobblin' Big Data with Ease" Filmed at QCon San Francisco 2014 brought to you by InfoQ. Downloaded from slideshare.net on Dec. 27, 2016. www.slideshare.net/InfoQ/gobblin-a-framework-for-solving-big-data-ingestion-problem.

Apache Sqoop: "Apache Sqoop" www.sqoop.apache.org/. Downloaded on Dec. 27, 2016.

\* cited by examiner

DYNAMIC DATA-INGESTION PIPELINE

BACKGROUND

Field

The described embodiments relate to techniques for ingesting data from a variety of sources. More specifically, the described embodiments relate to techniques for ingesting data from a variety of sources using a dynamic data-ingestion pipeline.

Related Art

Big data poses a variety of challenges associated with the high volume of data being handled, including the need for significant data-processing computational capabilities and the need for new processing techniques. In addition, the coexistence of heterogeneous data sources can pose problems in computer systems that handle big data. For example, the heterogeneous data sources can make these computer systems more complicated, with separate data processing for the data from each data source. Furthermore, ingesting a large amount of data from a given data source, and then integrating this data at high velocity and with high quality is often difficult and expensive.

In the absence of solutions for these challenges, computer systems that handle big data typically need to have significant memory in order to store the large amounts of data from the different data sources for subsequent processing. The use of off-line or non-real-time processing usually significantly increases the cost of the computer systems and can degrade their performance, which in turn can degrade the user experience when using applications that leverage the data handled by the computer systems.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to ingest data from an arbitrary source in a set of sources, a data-ingestion engine (such as a computer system) accesses predefined configuration instructions. Then, the data-ingestion engine generates a dynamic data-ingestion pipeline that is compatible with a Hadoop file system (such as a Hadoop distributed file system or HDFS), or another suitable file system, based on the predefined configuration instructions. This dynamic data-ingestion pipeline includes a modular arrangement of operators (or engines or software modules) from a set of operators that includes: an extraction operator for extracting the data of interest from the source, a converter operator for transforming the data, and a quality-checker operator for checking the transformed data. In an illustrative implementation, the quality-checker operator may check a record-level policy and/or a task-level policy.

Moreover, the data-ingestion engine receives the data from the source. Next, the dynamic data-ingestion pipeline processes the data as the data is received, without storing the data in memory for the purpose of subsequent ingestion processing.

Furthermore, the dynamic data-ingestion pipeline may egress the data to a sink in a set of sinks. The sink may be compatible with the Hadoop file system, and the set of operators may include a writer operator for outputting the data to the sink. Alternatively or additionally, the set of operators may include a publisher operator for checking an operator state, determining a task or job state, committing and cleaning up, and/or outputting the data to an output directory. This publisher operator may output the data when a subset of the operators in the dynamic data-ingestion pipeline is successfully completed or when all of the operators in the dynamic data-ingestion pipeline are successfully completed.

By dynamically configuring the data-ingestion engine, this data-ingestion technique may allow common hardware to be flexibly adapted to process the data from an arbitrary source. In addition, the data-ingestion engine may not require significant memory for storing the data, because the data is processed in real time, i.e., as the data is received from the source. Consequently, the data-ingestion technique may reduce the cost and increase the performance of a computer system that implements the data-ingestion technique. In turn, this can improve the performance of an application or a service that leverages the data handled by the computer system, which may enhance the user experience when using the application and/or the service.

In the discussion that follows, an individual or a user may be a person (for example, an existing user of a social network or a new user of a social network). Also, or instead, the data-ingestion technique may be used by any type of organization, such as a business. Furthermore, a 'business' should be understood to include for-profit corporations, non-profit corporations, groups (or cohorts) of individuals, sole proprietorships, government agencies, partnerships, etc.

Figure 1:
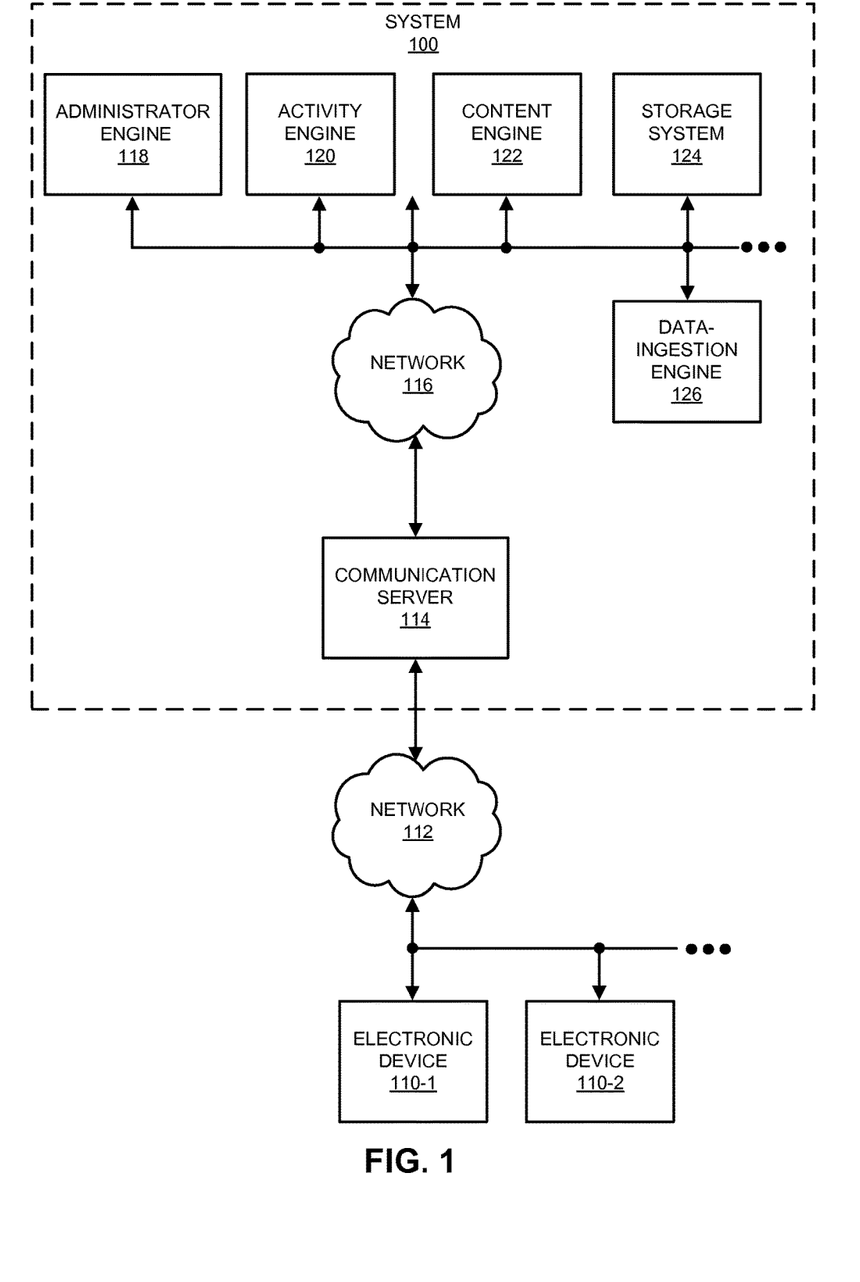
FIG. 1 is a block diagram illustrating a system used to perform data ingestion in accordance with an embodiment of the present disclosure.

We now describe embodiments of the system and its use. FIG. 1 presents a block diagram illustrating a system 100 that performs the data-ingestion technique. In this system, users of electronic devices 110 may use a service that is, at least in part, provided using one or more software products or applications executing in system 100. As described further below, the applications may be executed by engines in system 100.

Moreover, the service may, at least in part, be provided using instances of a software application that is resident on and that executes on electronic devices 110. In some implementations, the users may interact with a web page that is provided by communication server 114 via network 112, and which is rendered by web browsers on electronic devices 110. For example, at least a portion of the software application executing on electronic devices 110 may be an application tool that is embedded in the web page, and that executes in a virtual environment of the web browsers. Thus, the application tool may be provided to the users via a client-server architecture.

The software application operated by the users may be a standalone application or a portion of another application that is resident on and that executes on electronic devices 110 (such as a software application that is provided by communication server 114 or that is installed on and that executes on electronic devices 110).

A wide variety of services may be provided using system 100. In the discussion that follows, a social network (and, more generally, a network of users), such as a professional social network, which facilitates interactions among the users, is used as an illustrative example. Moreover, using one of electronic devices 110 (such as electronic device 110-1) as an illustrative example, a user of electronic device 110-1 may use the software application and one or more of the applications executed by engines in system 100 to interact with other users in the social network. For example, administrator engine 118 may handle user accounts and user profiles, activity engine 120 may track and aggregate user behaviors over time in the social network, content engine 122 may receive user-provided content (audio, video, text, graphics, multimedia content, verbal, written, and/or recorded information) and may provide documents (such as presentations, spreadsheets, word-processing documents, web pages, etc.) and/or other content to users, and storage system 124 may maintain data structures in a computer-readable memory that may encompass multiple devices, i.e., a large-scale storage system.

Note that each of the users of the social network may have an associated user profile that includes personal and/or professional characteristics and experiences, which are sometimes collectively referred to as 'attributes' or 'characteristics.' For example, a user profile may include: demographic information (such as age and gender), geographic location, work industry for a current employer, a functional area (e.g., engineering, sales, consulting), seniority in an organization, employer size, education (such as schools attended and degrees earned), employment history (such as previous employers and the current employer), professional development, interest segments, groups that the user is affiliated with or that the user tracks or follows, a job title, additional professional attributes (such as skills), and/or inferred attributes (which may include or be based on user behaviors). Moreover, user behaviors may include: log-in frequencies, search frequencies, search topics, browsing certain web pages, locations (such as IP addresses) associated with the users, advertising or recommendations presented to the users, user responses to the advertising or recommendations, likes or shares exchanged by the users, interest segments for the likes or shares, and/or a history of user activities when using the social network. Furthermore, the interactions among the users may help define a social graph in which nodes correspond to the users and edges between the nodes correspond to the users' interactions, interrelationships, and/or connections.

In general, the applications may access or use a wide variety of data or information from different sources. For example, the sources may include: a database, a message broker, a distributed key-value storage system, a Simple Storage Service (S3) file system, a Hadoop distributed file system (HDFS), a first file system on a first network (such as network 112 and/or 116) accessible via HyperText Transfer Protocol, a second file system on a second network accessible via File Transfer Protocol (such as network 112 and/or 116), and/or a local file system in system 100. However, ingesting a wide variety of data from different sources can be expensive and complicated.

In order to address this problem and use data received or obtained from an arbitrary source, system 100 may need to ingest the data in real time (or "on the fly") and perform operations on the data to convert or transform the data to a common format, and/or clean up the data or test the data for quality assurance. In addition, system 100 may output the data to one or more sinks (i.e., there may be one-to-many egress of the data). As described further below with reference to FIGS. 2 and 3, this may be accomplished using a dynamically configurable or adaptable data-ingestion engine 126 (which is sometimes referred to as a 'universal data-ingestion engine'), as opposed to using separate or independent data-ingestion engines for each source (which can be hard to maintain or can make it hard to ensure quality).

In particular, data-ingestion engine 126 may access predefined configuration instructions. Then, data-ingestion engine 126 may generate a dynamic data-ingestion pipeline that is compatible with a Hadoop file system based on the predefined configuration instructions. As described further below with reference to FIGS. 4 and 5, this dynamic data-ingestion pipeline may include a modular arrangement of operators (or engines or software modules) from a set of operators that includes: an extraction operator for extracting the data of interest from the source, a converter operator for transforming the data, and a quality-checker operator for checking the transformed data.

During the data-ingestion process, data-ingestion engine 126 may receive the data from the source, and the dynamic data-ingestion pipeline may process the data as it is received, without retaining the data in memory for subsequent ingestion processing. In other words, the data may be processed in real-time.

Furthermore, the dynamic data-ingestion pipeline may egress the data to a sink in a set of sinks. The sink may be compatible with the Hadoop file system, and the set of operators may include a writer operator for outputting the data to the sink and/or a publisher operator. This publisher operator may output the data when a subset of the operators in the dynamic data-ingestion pipeline is successfully completed or when all of the operators in the dynamic data-ingestion pipeline are successfully completed.

In these ways, the data-ingestion technique may allow system 100 to adapt to a wide variety of data types and sources. By using a dynamically configurable or adaptable data-ingestion engine 126, the data-ingestion technique may reduce the cost of system 100 (e.g., by reducing the amount of memory required for data ingestion) and may improve the performance or functioning of system 100, which may reduce user frustration and may improve the user experience. Therefore, the data-ingestion technique may increase engagement with or use of the social network, and thus may increase the revenue of a provider of the social network.

Note that information in system 100 may be stored at one or more locations (i.e., locally and/or remotely). Moreover, because this data may be sensitive in nature, it may be encrypted. For example, stored data and/or data communicated via networks 112 and/or 116 may be encrypted.

Figure 2:
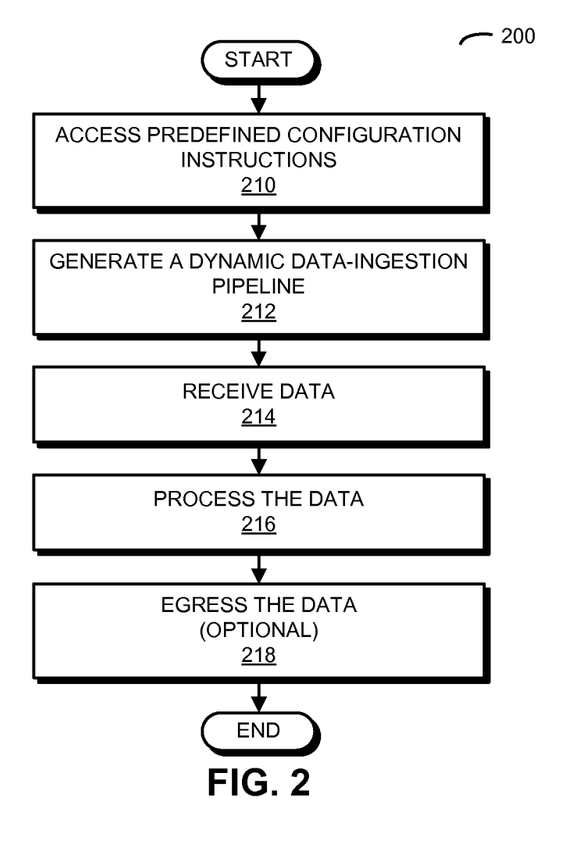
FIG. 2 is a flow chart illustrating a method for ingesting data from a source in a set of sources in accordance with an embodiment of the present disclosure.

We now describe embodiments of the data-ingestion technique. FIG. 2 presents a flow chart illustrating a method 200 for ingesting data from a source in a set of sources, which may be performed by a computer system (such as system 100 in FIG. 1, data-ingestion engine 126 in FIG. 1, or computer system 600 in FIG. 6). During operation, the computer system accesses predefined configuration instructions (operation 210). Then, the computer system generates a dynamic data-ingestion pipeline (operation 212) compatible with a Hadoop file system based on the predefined configuration instructions, where the dynamic data-ingestion pipeline includes a modular arrangement of operators from a set of operators that includes an extraction operator for extracting the data of interest from the source, a converter operator for transforming the data, and a quality-checker operator for checking the transformed data (e.g., by checking a record-level policy and/or a task-level policy).

Moreover, the computer system receives the data (operation 214) from the source in the set of sources. Note that the set of sources may include or be compatible with: a database, a message broker, a distributed key-value storage system, a Simple Storage Service (S3) file system, a first file system on a first network accessible via HyperText Transfer Protocol, a second file system on a second network accessible via File Transfer Protocol, and/or a local file system.

Furthermore, the computer system processes the data (operation 216) using the dynamic data-ingestion pipeline, as the data is received, without storing the data in memory for the purpose of subsequent ingestion processing.

In some embodiments, the computer system egresses the data (operation 218) to a sink in a set of sinks using the dynamic data-ingestion pipeline, where the sink is compatible with the Hadoop file system, and the set of operators includes a writer operator for outputting the data to the sink and/or a publisher operator for outputting the data to an output directory. Note that the publisher operator may output the data when all of the operators in the dynamic data-ingestion pipeline are successfully completed or when a subset of the operators in the dynamic data-ingestion pipeline is successfully completed.

Additionally, note that processing of the data using the dynamic data-ingestion pipeline may be performed as a batch process. In some embodiments, the processing of the data using the dynamic data-ingestion pipeline involves parallel processing of workunits.

Figure 3:
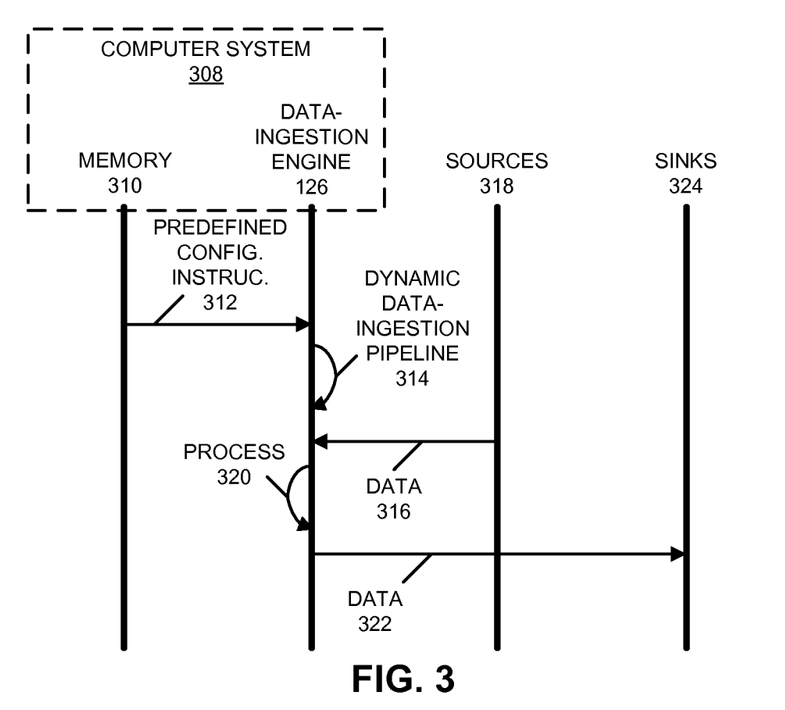
FIG. 3 is a drawing illustrating interactions among components in the system of FIG. 1 in accordance with an embodiment of the present disclosure.

In an exemplary embodiment, method 200 is implemented using a data-ingestion engine in the computer system, such as data-ingestion engine 126 (FIG. 1). This is illustrated in FIG. 3. During this method, data-ingestion engine 126 may access predefined configuration instructions 312 in memory 310 in computer system 308. Then, data-ingestion engine 126 may generate a dynamic data-ingestion pipeline 314 compatible with a Hadoop file system based on predefined configuration instructions 312, where dynamic data-ingestion pipeline 314 includes the modular arrangement of operators from the set of operators.

Moreover, data-ingestion engine 126 may receive data 316 from one of sources 318. Furthermore, data-ingestion engine 126 may process 320 data 316 using dynamic data-ingestion pipeline 314 as data 316 is received without storing data 316 in memory 310 for the purpose of subsequent ingestion processing.

After processing, data-ingestion engine 126 may egress data 322 to one or more of sinks 324 using dynamic data-ingestion pipeline 314, where the sink is compatible with the Hadoop file system.

In some embodiments of method 200 (FIGS. 2 and 3), there may be additional or fewer operations. Moreover, the order of the operations may be changed, and/or two or more operations may be combined into a single operation.

In an exemplary embodiment, the data-ingestion technique dynamically processes a variety of data from internal and/or external sources to deliver analytics and/or business insights. Instead of using independent pipelines (which are often hard to maintain and operate, can be difficult to scale, and can make it difficult to ensure data quality), a universal data-ingestion engine for heterogeneous sources may be used to provide a unified data-ingestion framework. This data-ingestion engine may: transform data to a common format (such as a Hadoop or a Hadoop-compatible format, which is used as an illustrative example herein), check the data for quality and/or clean it up, and/or provide data movement/transport. In particular, the data-ingestion engine may include a pipeline that is dynamically configured on the fly. This data-ingestion engine may transform the data by filtering columns and rows, performing a projection, converting a schema, etc. Note that, after the data-ingestion pipeline, a computer system may perform extraction, transformation and load (ETL), which are distinct or separate operations from those in the data-ingestion pipeline.

This approach may use less memory and, thus, may reduce cost and may offer a significant improvement in performance. It also may avoid operations that execute slowly (a so-called 'long tail') because of issues such as skew and load-balancing. In addition, the data-ingestion engine may smoothly ingest data, which may allow a mashup of disparate types of data and/or delivery or meaningful business metrics.

The data-ingestion engine may ingest data from an arbitrary source to Hadoop. After performing one or more operations on the data (such as extracting the data of interest from the source, transforming the data, and checking the quality of the transformed data), the data-ingestion engine may perform an egress operation to output the transformed data from Hadoop to one or more target sinks (or destinations). Thus, the data-ingestion engine may be compatible with an arbitrary file system via a Hadoop interface.

Moreover, the data-ingestion engine may be modular, so that it can be dynamically configured to perform one or more operations in an arbitrary execution framework or operational architecture, such as an arbitrary arrangement of: an extractor or ingestion operator, a converter or transformation operator, a quality-checker operator and/or a writer or egress operator. For example, an extractor operator may extract or retrieve data records of interest from a source, in the same way that a SQL query in a relational database extracts a flow line-by-line in a file. Furthermore, a converter operator may be used to transform data, such as: chaining transformations that implement complex logic, dropping a column with sensitive information, converting a row into a different format, masking, filtering, projection, timezone conversion, etc. Additionally, a quality-checker operator may check count equality, a count range (relative to historical data), schema compatibility, etc. Note that data processing of a job in the data-ingestion engine may be partitioned into workunits, which may be executed in parallel.

In an exemplary embodiment, the data-ingestion engine is implemented using a distributed framework. Each machine or computer system in this distributed framework may include a scheduler that generates jobs based on job-configuration information. Then, a job launcher may initiate jobs using data from a data source, where the jobs are performed by a thread pool (which may be implemented using a Java virtual machine), Hadoop (with a map-reduced execution framework), and/or Yarn or a next-generation Hadoop (with a resource negotiator). Note that the data-ingestion engine may track the task state for the jobs. If a job fails, the data-ingestion engine may repeat some or all of the associated workunits base on a predefined policy.

The data-ingestion engine may support a mixture of data sources, and can be easily extended for more. This capability may enable a single framework to handle different data-ingestion needs, making it easy and inexpensive to operate. Furthermore, with an end-to-end metrics collection and reporting module, the data-ingestion engine may make it simple and efficient to identify issues during operation.

During operation of applications, data is constantly obtained and written into online data-storage systems or streaming systems, as well as external sites. This data may include user profiles, connections, posts and many other external and internal activities. These data sources may daily crop terabytes worth of data, most of which may need to be loaded into one or more Hadoop clusters to feed business- or consumer-oriented analysis. The data-ingestion engine may be configured to ingest data from several different types of sources, and may be extensible to new data sources and use cases.

The data-ingestion engine may address problems such as: source integration, the processing paradigm, data-quality assurance, extensibility, and self-service. In particular, for source integration, the data-ingestion engine may provide out-of-the-box adaptors for commonly accessed data sources. Moreover, for the processing paradigm, the data-ingestion engine may support standalone and scalable platforms, including Hadoop and Yarn. Integration with Yarn may provide the ability to run continuous ingestion in addition to scheduled batches. Furthermore, for extensibility, the data-ingestion engine may allow data-pipeline developers to integrate their own adaptors with the framework, and may make it leverageable for other developers in the community. Additionally, for self-service, data pipeline developers can compose a data-ingestion and transformation flow in a self-serviced manner, test it locally using a stand-alone mode, and deploy the flow in production using a scale-out mode without requiring that the code change. Finally, for data-quality assurance, the data-ingestion engine may expose data-metrics collectors and data-quality checkers as first class citizens, which can be used to power continuous data validation.

Figure 4:
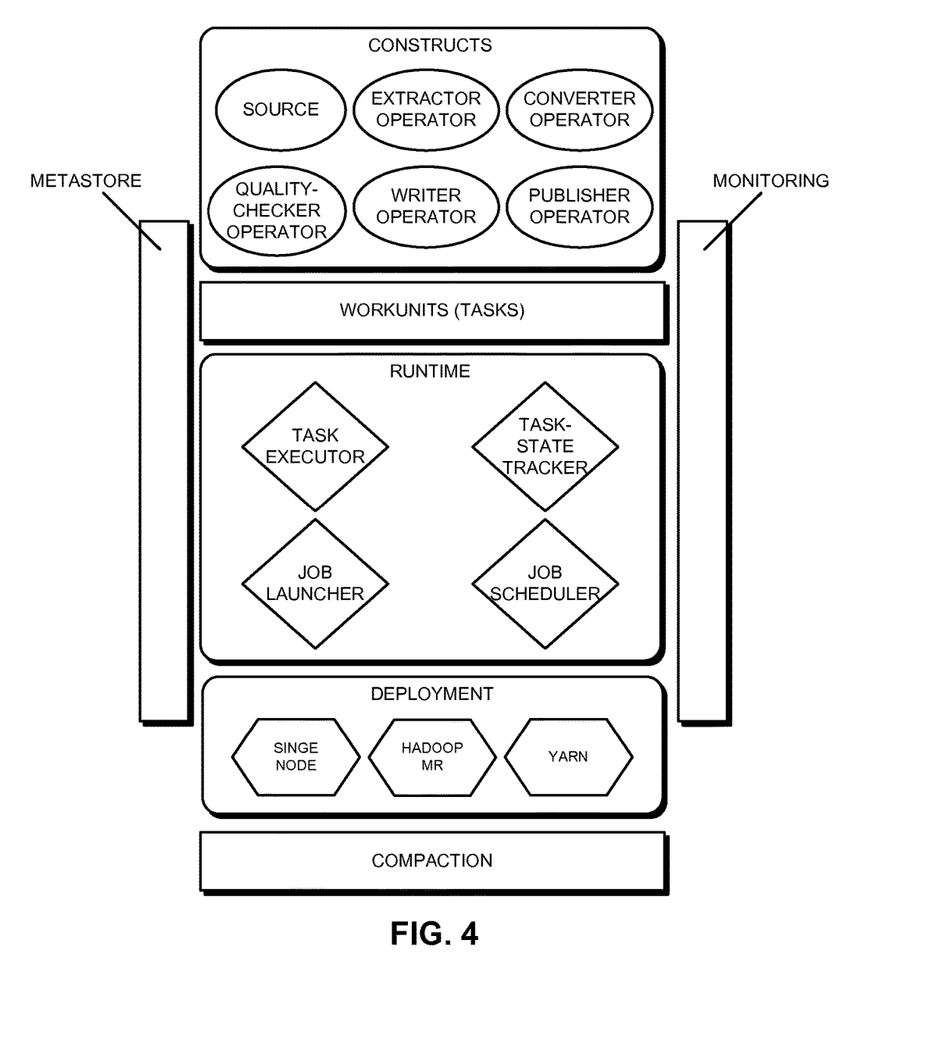
FIG. 4 is a drawing illustrating the architecture of a data-ingestion engine in the system of FIG. 1 in accordance with an embodiment of the present disclosure.

An illustrative architecture of the data-ingestion engine is shown in FIG. 4. The illustrated data-ingestion engine may ingest data from a data source (such as a NoSQL data store) into a sink (such as a HDFS). Note that a job may include multiple workunits, or tasks, each of which represents a unit of work to be performed, e.g., extracting data from a NoSQL-data-store table partition or a high-throughput messaging-system topic partition.

A job may be formulated around a set of constructs (illustrative constructs are depicted as ellipses). The data-ingestion engine may provide an interface for each of the constructs. Therefore, a job can be customized by implementing these interfaces, or extending the out-of-the-box implementations in the data-ingestion engine.

Figure 5:
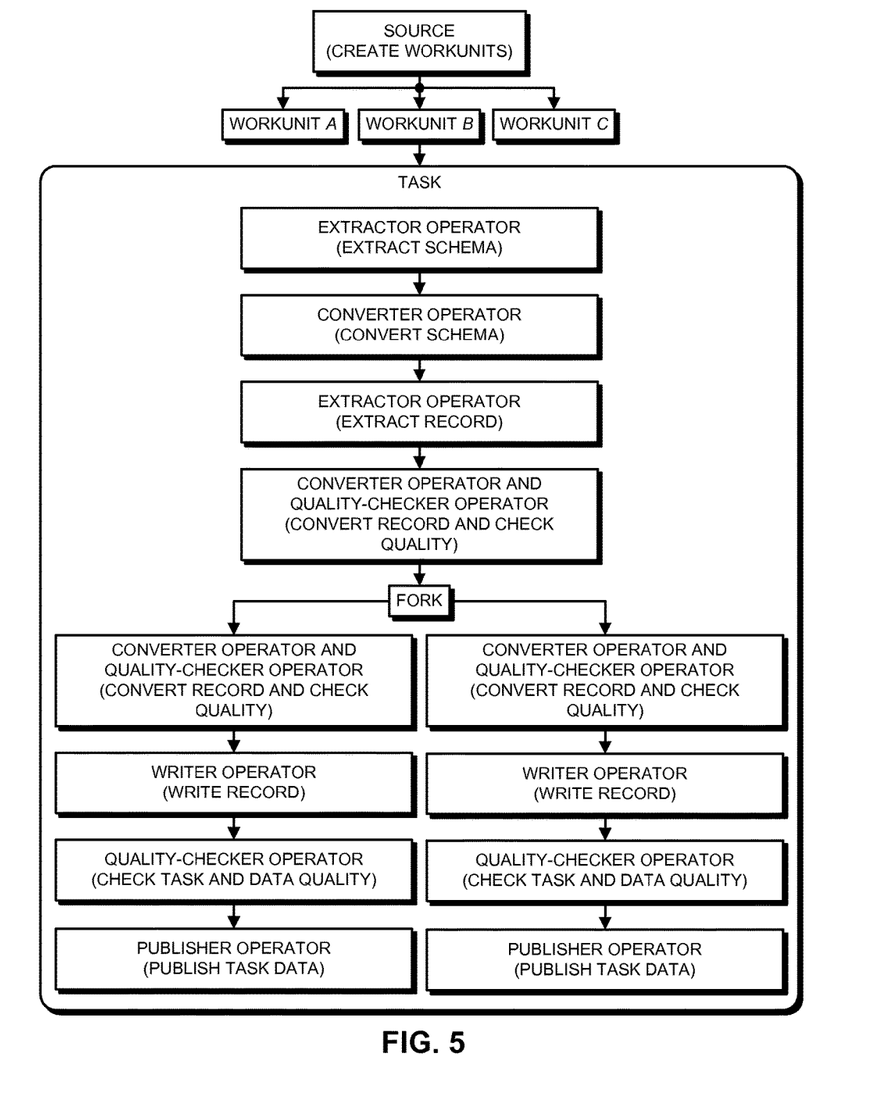
FIG. 5 is a flow chart illustrating a task flow for ingesting data from a source in accordance with an embodiment of the present disclosure.

With reference now to FIG. 5, which presents a task flow for ingesting data from a source, it may be noted that a source may be responsible for partitioning data ingestion work into a set of workunits and also for specifying an extractor operator per workunit. The technique for generating workunits may, in general, divide the work as evenly as possible among. In some embodiments, a hash-based or bin-packing-based approach is used.

Moreover, an extractor operator may perform the work specified in a workunit, e.g., extracting certain data records. The workunit may include or specify where to pull data from (e.g., which NoSQL-data-store partition, which database table, etc.), as well as what portion of the data should be pulled. The data-ingestion engine may use a watermark object to tell an extractor operator the start record (e.g., the low watermark) and end record (e.g., the high watermark). For example, for NoSQL-data-store jobs, the watermarks can be offsets of a partition, and, for database jobs, the watermarks can be values of a column. Note that a watermark can be of any type, not necessarily numeric, as long as there is a way for the extractor operator to know where to start and where to finish.

Furthermore, a converter operator may perform data transformation on the fly while data is being pulled. There are often use cases that require such conversions, e.g., some fields in the schema may need to be projected out for privacy reasons, or data pulled from the source may be byte arrays or JavaScript Object Notation (JSON) objects, which may need to be converted to the desired output formats. A converter operator can convert one input record into zero or more records. Note that converter operators may be pluggable and chainable, and it may be possible to deploy one that implements two techniques for converting schema and data records, respectively.

Additionally, a quality-checker operator may determine whether the extracted records are in good shape and can be published. There may be two types of quality-checking policies in terms of scope, namely record-level policies and task-level policies, which, respectively, check the integrity of a single record and the entire output of a task. There may also be two types of quality-checking policies used: policies, and optional policies. Violation of a policy may result in the record or task output being discarded or written to an outlier folder, while violation of an optional policy may result in warnings.

Note that a writer operator may write records extracted by a task to the appropriate sinks. It may first write records that pass record-level policies to a staging directory. After the task successfully completes and all records of the task have been written to the staging directory, the writer operator may move them to a writer output directory, which may be pending audit against task-level quality-checking policies and may then be published by a publisher operator. The data-ingestion engine writer operator can be extended to publish data to different sinks (such as a HDFS, a high-throughput messaging system, S3, etc.), publish data in different formats (such as a remote procedure call and serialization data framework, a columnar storage format, comma-separate variable, etc.), and/or publish data in different folder structures with different partitioning semantics. For example, many datasets may be published in 'hourly' and 'daily' folders that contain records with timestamps in that hour or day.

Moreover, a publisher operator may publish the data written by the writer operators atomically to the job output directory. The data-ingestion engine may provide two commit policies: commit-on-full-success (which may only commit data if all tasks succeeded), and commit-on-partial-success (which may commit data for all succeeded tasks). Note that, for each failed task, partial data may be committed if the task moved them from the staging directory to the output directory. In addition to these constructs, the data-ingestion engine may support branching in a task flow through fork operators that allow an extracted record to be processed by different branches. Each fork may have its own converter operators, quality-checker operators, writer operators and publisher operators, and thus different forks may publish a record to different sinks, or to the same sink but in different formats. An example, of FIG. 5 presents a task flow for ingesting data from a source is shown in FIG. 5.

Returning now to FIG. 4, the data-ingestion engine may employ a meta store (which is sometimes referred to as a 'state store') for managing job and task states across job runs. Upon completion of each run of a job, the high watermark along with other runtime metadata (e.g., the latest data schema) of each task may be persisted into the state store. Moreover, the next run of the same job may pick up the runtime metadata of the previous run from the state store and may make the metadata available to the source or the extractor operator so it can start where the previous run left off.

By default, the data-ingestion engine uses an implementation of the state store that serializes job and task states into Hadoop sequence files, one per job run. Each job may have a separate directory where the state-store sequence files of its runs are stored. Upon start, each run of a job may read the sequence file of the previous run in the corresponding directory to get its run-time metadata. In order to prevent the state store from growing indefinitely in size, the data-ingestion engine may provide a utility for cleaning up the state store based on a configurable retention setting. Furthermore, the data-ingestion engine may also allow users to plug-in their own state store implementations that conform to the state-store interface through a configuration property.

Once a job is created, the data-ingestion-engine job execution runtime (or runtime engine) may be responsible for running the job on the platform of a given deployment mode. Tasks such as job/task scheduling, job/task state management, error handling and retries, monitoring and reporting, etc., may be handled by the runtime.

For error handling, the data-ingestion engine may employ multiple levels of defenses against job and task failures. For example, for job failures, data-ingestion engine may keep track of the number of times a job fails consecutively and may optionally send out an alert email if the number exceeds a predefined threshold, so that the owner of the job can jump in and investigate the failures. Moreover, for task failures, the data-ingestion engine may retry failed tasks in a job run up to a configurable maximum number of times. In addition, the data-ingestion engine may also provide an option to enable retries of workunits corresponding to failed tasks across job runs, so that if a task fails after all retries fail, the workunit on which the task was created may be automatically included in the next run of the job if this type of retries is enabled. This approach may be useful in handling intermittent failures, such as those due to a temporary data-source outage.

In terms of job scheduling, the data-ingestion engine can be integrated with job schedulers. The data-ingestion engine may also include a built-in job scheduler. Moreover, the data-ingestion engine may decouple the job scheduler and the jobs, so that different jobs may run in different deployment settings.

Furthermore, the data-ingestion engine may include an end-to-end system for metric collection and reporting using a generic metric library for monitoring purposes. The library may support various types of metrics, including counters, gauges, histograms, meters, etc., and may be able to report metrics to multiple backend systems, e.g., a high-throughput messaging system (such as Kafka), a real-time graphing system (such as Graphite), Java management extensions, and logs. It may also perform automatic metric aggregation using a hierarchical metric collection structure in which a metric at a higher level is automatically updated upon any updates to lower level metrics with the same name. This approach may help reduce the amount of processing needed in the metric backend without incurring significant additional overhead.

Additionally, the data-ingestion engine may include a compaction module for data compaction. This module may provide one or more compactors (such as a compactor implemented using Hive and/or a compactor implemented using MapReduce), which may perform deduplications. For example, event data may be pulled into hourly folders that are compacted once a day into daily folders with duplicates removed. Compactors using different logics (e.g., a compactor that simply merges hourly data without deduplication, or a compactor that always picks records with the latest timestamp in deduplication) can be directly plugged in into this infrastructure.

The data-ingestion engine may be capable of running in several modes of deployment (which are sometimes referred to as 'hexagons') on different platforms for different scalability and resource-usage requirements. For example, the data-ingestion engine can run in a standalone mode on a single machine using a dedicated thread pool to run tasks, as well as in MapReduce mode on Hadoop using mappers as containers to run tasks. This capability enables a user to test a flow in standalone mode and to deploy it in production using MapReduce mode without code change.

In some embodiments, the data-ingestion engine is run on Yarn for more flexible and efficient resource management and the ability to run as a long-running service. This approach may be useful for ingesting data from streaming data sources such as high-throughput messaging system. Note that, when the data-ingestion engine is run on Yarn, it may use Helix (or another database management system) to manage workunits running in a cluster of Yarn containers with help from ZooKeeper (or another application programming interface for synchronizing distributed processes) for coordination and messaging between the Yarn application master and the containers. ZooKeeper may also be used as a central repository for metadata of running workunits. Moreover, Helix, as a framework for managing distributed resources in a cluster, may ensure that workunits are evenly distributed among the available containers and may also be responsible for rebalancing in case of container failures or shutdown. When data-ingestion engine is run on Yarn, it may achieve more efficient resource management by adapting to changing workloads, and may resize the cluster of Yarn containers dynamically at runtime.

In production, the data-ingestion engine is configured to ingest data from a source into a HDFS using a configuration file. For example, the data-ingestion engine may be used to ingest over 300 datasets from 12 unique sources. These sources may be of several different types, including MySQL, SQL server, secure file transfer protocol servers, S3 representation state transfer, etc. In addition, the data-ingestion engine may be used to purge data in order to meet data-compliance requirements (e.g., deleting a user's data within a certain number of days of account closure).

In an exemplary embodiment, the data-ingestion engine is used to extract data from a high-throughput-messaging-system source and/or a Java-database-connectivity source. In the case of the high-throughput-messaging-system source, more than 3000 topics with tens of thousands of partitions may be constantly ingested to Hadoop clusters. These topics may include user activities (such as page views and sending messages), metrics, as well as a variety of internal events that need to be tracked. This data may be ingested using the data-ingestion engine with improved performance, stableness, operability and data integrity relative to a dedicated open-source pipeline.

In this example, recall that a source may be responsible for generating workunits. In order to ingest from the high-throughput-messaging-system source, a source may that generates workunits from the high-throughput-messaging-system source may be implemented. Such a workunit may contain, for each partition, the start and end offsets (i.e., the low watermark and the high watermark) to be pulled. Moreover, for each topic partition that is to be ingested, the data-ingestion engine may retrieve the last offset pulled by the previous run, which may be used as the start offset of the current run. In addition, the data-ingestion engine may retrieve the earliest and latest offsets currently available from the high-throughput-messaging-system cluster, and may verify that the start offset is between the earliest and the latest offsets. The latest available offset may be the end offset to be pulled by the current workunit. Because new records may be constantly published to the high-throughput-messaging-system source and old records may be deleted based on retention settings, the earliest and latest offsets of a partition may change constantly. This may add pressure to the data-ingestion pipeline, because its speed typically must be faster than the speed records are published to the high-throughput-messaging-system source.

For each partition, after the start and end offsets may be determined, an initial workunit may be created. Moreover, after obtaining all initial workunits, one for each partition, two operations may be performed using bin-packing-based techniques. In the first operation, some workunits corresponding to partitions of the same topic may be merged into bigger workunits, so that these partitions can write to the same output file, which may reduce the number of small files published on the HDFS (which, in turn, may reduce pressure on the name node). Moreover, in the second operation workunits may be assigned to containers and the workload of the containers may be balanced.

As discussed previously, a high-throughput-messaging-system workunit may have one or more partitions of the same topic. An extractor operator may be created for each workunit, which pulls partitions one by one, and if a partition cannot be pulled, the extractor operator may skip the partition (and may report the failure in the metrics) but it may not fail the task, so that different partitions may be isolated and do not affect each other. After all partitions are pulled, the extractor operator may report the last offset pulled for each partition to a state object that may be persisted to the state store by the data-ingestion-engine runtime.

Moreover, in terms of the converter operator, the high-throughput-messaging-system clusters may store records in an Avro format. The converter operator may: filter Avro records based on field values, remove fields from Avro records (such as certain sensitive fields that may need to be removed from Avro records before they can be published), convert Avro records to JSON objects, etc.

Furthermore, in terms of the quality-checker operator, because the high-throughput-messaging-system data is ingested into time partitioned (e.g., hourly and daily) folders, the data-ingestion engine may use a record-level quality policy that checks whether each record has a timestamp field. If yes, it can be written to the appropriate folder. Otherwise, it may be discarded or written to an outlier folder. Another policy may be used to verify whether the primary key field of a record exists and is non-null.

Additionally, in terms of the writer operator and the publisher operator, for high-throughput-messaging-system ingestion, a time-partitioned writer operator and a time-partitioned publisher operator may be implemented, which, respectively, write and publish each record to the appropriate time-partitioned folder based on its timestamp.

In the case of ingestion from a Java-database-connectivity source to a HDFS, the Java-database-connectivity protocol may offer a clean abstraction for using Java code to query and manipulate a variety of relational data stores. For example, the data-ingestion engine may pull about 250 tables from MySQL and SQL server. A principle difference with the high-throughput-messaging-system example is that database tuples are mutable while high-throughput-messaging-system records are not. Therefore, Java-database-connectivity ingestion not only needs to pull new tuples, but may also need a way to handle updated tuples.

The data-ingestion engine may provide at least two sources for Java-database connectivity, a MySQL source and a SQL-server Source. These sources may use the same technique for generating workunits, and the difference may be that the MySQL source uses a MySQL extractor operator and the SQL-server Source may uses a SQL-server extractor operator. In order to generate workunits, for each table that should be pulled, the latest timestamp of a tuple pulled by the previous run may be retrieved and used as the low watermark. The current time may be used as the high watermark. Then, the interval from low watermark to high watermark may be divided into a configurable number of partitions of equal length. Note that a workunit may be created for each partition.

Moreover the MySQL and SQL-server extractor operators may get the tuples with the specified timestamp values from the databases using SQL queries, and may return them as JSON elements. These extractor operators may report the latest timestamp pulled, which may be persisted into the state store and may be available for the next run.

In terms of the converter operator and the quality-checker operator. The ingested data in the HDFS may be stored in Avro format. Therefore, the data-ingestion engine may use a converter operator to convert JSON elements into Avro records. In addition, the data-ingestion engine may use a task-level quality-checking policy to ensure that the number of records written is the same as the number of rows returned by a count query.

Furthermore, in terms of the writer operator and the publisher operator, database tuples may not be written into time-partitioned folders for Java-database-connectivity ingestion, because users of the data often need to access an entire table rather than tuples in a specific hour or day. The data-ingestion engine may use a writer operator and a publisher operator to publish the records of each table in a single folder.

As noted previously, in Java-database-connectivity ingestion, a way to handle tuple updates may be needed. One approach is to pull each table in its entirety in each run, which may not be feasible for large tables and may be inefficient for tables with only a small portion of updated tuples between two runs. Another approach for such tables involves multiple job types for Java-database-connectivity ingestion. In particular, a snapshot job, which pulls an entire table, may be scheduled at a relatively low frequency. Moreover, an append job may only pull the tuples whose modification timestamps are later than the latest timestamp pulled by the previous run (which may be either a snapshot job or an append job). Note that append jobs may be scheduled at higher frequencies. Furthermore, not that this may require the table has a modification-timestamp column. Additionally, note that different versions of a tuple may exist in the extracted snapshot and append data files.

Note that users may directly consume the extracted snapshot and append files if their applications can accommodate the existence of multiple versions of a tuple, or if they have a way to pick the latest version of a tuple if multiple versions exist. Otherwise, the data-ingestion engine may have a compaction module (as was described previously) that can be used to compact the snapshot and the append files.

Alternatively, users can run a snapshot-append job which may run an append job followed by compaction.

In some embodiments, instead of using record-level abstraction in its execution flow (i.e., the unit to be pulled is a record), the data-ingestion engine is extended to file-level abstraction, which may enable the data-ingestion engine to be used as a high-performance file transfer service across various file systems, including: network file system, HDFS, S3, etc. as well as across data centers or regions.

In summary, the data-ingestion engine may provide a framework for ingesting data into Hadoop. The data-ingestion engine may be generic and extensible so that it can be used for a variety of data-ingestion use cases, as well as providing easy operation and monitoring.

Figure 6:
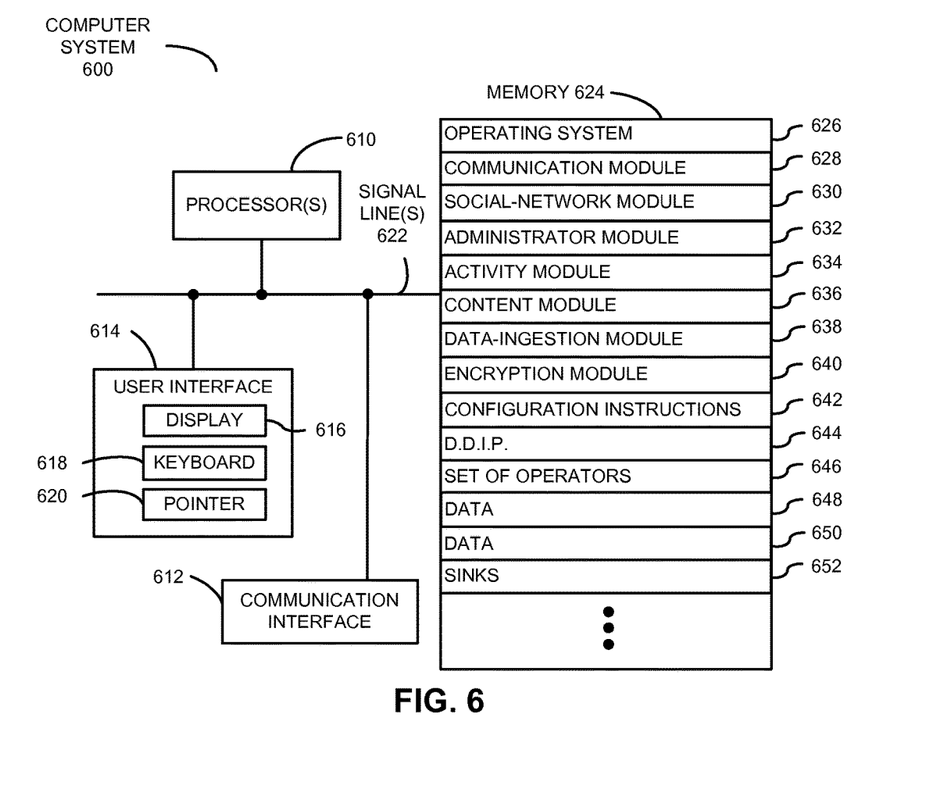
FIG. 6 is a block diagram illustrating a computer system that performs the method of FIGS. 2 and 3 in accordance with an embodiment of the present disclosure.

We now describe embodiments of a computer system for performing the data-ingestion technique and its use. FIG. 6 presents a block diagram illustrating a computer system 600 that performs method 200 (FIGS. 2 and 3), such as system 100 in FIG. 1, computer system 308 in FIG. 3, or data-ingestion engine 126 in FIGS. 1 and 3. Computer system 600 includes one or more processing units or processors 610 (which are sometimes referred to as 'processing modules'), a communication interface 612, a user interface 614, memory 624, and one or more signal lines 622 coupling these components together. Note that the one or more processors 610 may support parallel processing and/or multi-threaded operation, the communication interface 612 may have a persistent communication connection, and the one or more signal lines 622 may constitute a communication bus. Moreover, the user interface 614 may include: a display 616 (such as a touchscreen), a keyboard 618, and/or a pointer 620 (such as a mouse).

Memory 624 in computer system 600 may include volatile memory and/or non-volatile memory. More specifically, memory 624 may include: ROM, RAM, EPROM, EEPROM, flash memory, one or more smart cards, one or more magnetic disc storage devices, and/or one or more optical storage devices. Memory 624 may store an operating system 626 that includes procedures (or a set of instructions) for handling various basic system services for performing hardware-dependent tasks. Memory 624 may also store procedures (or a set of instructions) in a communication module 628. These communication procedures may be used for communicating with one or more computers and/or servers, including computers and/or servers that are remotely located with respect to computer system 600.

Memory 624 may also include multiple program modules, including: social-network module 630, administrator module 632, activity module 634, content module 636, data-ingestion module 638 and/or encryption module 640. Note that one or more of these program modules (or sets of instructions) may constitute a computer-program mechanism, i.e., software.

During operation of computer system 600, users of a social network facilitated by social-network module 630 may set up and manage accounts using administrator module 632. Moreover, social-network module 630 may facilitate interactions among the users via communication module 628 and communication interface 612. These interactions may be tracked by activity module 634, such as viewing behavior of the users when viewing documents (and, more generally, content), provided by content module 636, in the social network that is implemented using social-network module 630.

Furthermore, during operation of social-network module 630 (or related applications), data 650 may be dynamically processed using data-ingestion module 638. In particular, data-ingestion engine 638 may access predefined configuration instructions 642. Then, data-ingestion module 638 may generate a dynamic data-ingestion pipeline (D.D.I.P.) 644 compatible with a Hadoop file system based on predefined configuration instructions 642, where dynamic data-ingestion pipeline 644 includes a modular arrangement of operators from a set of operators 646.

Additionally, data-ingestion module 638 may receive, via communication interface 612 and communication module 628, data 648 from one of sources 650. Furthermore, data-ingestion module 638 may process data 650 using dynamic data-ingestion pipeline 644 as data 648 is received without storing data 648 in memory 624 for the purpose of subsequent ingestion processing.

After processing, data-ingestion module 638 may egress, via communication module 628 and communication interface 612, data 650 to one or more of sinks 652 using dynamic data-ingestion pipeline 644, where the sink may be compatible with the Hadoop file system.

Because information in computer system 600 may be sensitive in nature, in some embodiments at least some of the data stored in memory 624 and/or at least some of the data communicated using communication module 628 is encrypted using encryption module 640.

Instructions in the various modules in memory 624 may be implemented in a high-level procedural language, an object-oriented programming language, and/or in an assembly or machine language. Note that the programming language may be compiled or interpreted, e.g., configurable or configured, to be executed by the one or more processors.

Although computer system 600 is illustrated as having a number of discrete items, FIG. 6 is intended to be a functional description of the various features that may be present in computer system 600 rather than a structural schematic of the embodiments described herein. In practice, and as recognized by those of ordinary skill in the art, the functions of computer system 600 may be distributed over a large number of servers or computers, with various groups of the servers or computers performing particular subsets of the functions. In some embodiments, some or all of the functionality of computer system 600 is implemented in one or more application-specific integrated circuits (ASICs) and/or one or more digital signal processors (DSPs).

Computer systems (such as computer system 600), as well as electronic devices, computers and servers in system 100 (FIG. 1), may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a server and/or a client computer (in a client-server architecture). Moreover, network 112 (FIG. 1) may include: the Internet, World Wide Web (WWW), an intranet, a cellular-telephone network, LAN, WAN, MAN, or a combination of networks, or other technology enabling communication between computing systems.

System 100 (FIG. 1) and/or computer system 600 may include fewer components or additional components. Moreover, two or more components may be combined into a single component, and/or a position of one or more components may be changed. In some embodiments, the functionality of system 100 (FIG. 1) and/or computer system 600 may be implemented more in hardware and less in software, or less in hardware and more in software, as is known in the art.

While a social network has been used as an illustration in the preceding embodiments, more generally the data-ingestion technique may be used to ingest from and/or output data to a wide variety of applications, services or systems. Moreover, the data-ingestion technique may be used in applications where the communication or interactions among different entities (such as people, organizations, etc.) can be described by a social graph. Note that the people may be loosely affiliated with a website (such as viewers or users of the website), and thus may include people who are not formally associated (as opposed to the users of a social network who have user accounts). Thus, the connections in the social graph may be defined less stringently than by explicit acceptance of requests by individuals to associate or establish connections with each other, such as people who have previously communicated with each other (or not) using a communication protocol, or people who have previously viewed each other's home pages (or not), etc. In this way, the data-ingestion technique may be used to expand the quality of interactions and value-added services among relevant or potentially interested people in a more loosely defined group of people.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-system-implemented method for ingesting data from a source in a set of sources, the method comprising:
    accessing predefined configuration instructions;
    generating a dynamic data-ingestion pipeline compatible with a Hadoop file system based on the predefined configuration instructions, wherein the dynamic data-ingestion pipeline includes a modular arrangement of operators from a set of operators that includes: an extraction operator for extracting the data of interest from the source, a converter operator for transforming the data, and a quality-checker operator for checking the transformed data;
    receiving the data from the source; and
    processing the data, by a computer system, using the dynamic data-ingestion pipeline implemented on the computer system by:
        using the converter operator to transform the received data into a common format compatible with the Hadoop file system;
        wherein the data is processed in real-time as the data is received, without storing the data in memory for the purpose of subsequent ingestion processing, thereby reducing storage requirements of the computer system.

2. The method of claim 1, wherein the set of sources is compatible with one of: a database, a message broker, a distributed key-value storage system, a Simple Storage Service (S3) file system, a first file system on a first network accessible via HyperText Transfer Protocol, a second file system on a second network accessible via File Transfer Protocol, and a local file system.

3. The method of claim 1, wherein the dynamic data-ingestion pipeline egresses the data to a sink in a set of sinks;
    wherein the sink is compatible with the Hadoop file system; and
    wherein the set of operators includes a writer operator for outputting the data to the sink.

4. The method of claim 1, wherein the set of operators includes a publisher operator for outputting the data to an output directory.

5. The method of claim 4, wherein the publisher operator outputs the data when all of the operators in the dynamic data-ingestion pipeline are successfully completed.

6. The method of claim 4, wherein the publisher operator outputs the data when a subset of the operators in the dynamic data-ingestion pipeline is successfully completed.

7. The method of claim 1, wherein the processing of the data using the dynamic data-ingestion pipeline is performed as a batch process.

8. The method of claim 1, wherein the processing of the data using the dynamic data-ingestion pipeline involves parallel processing of workunits.

9. The method of claim 1, wherein the quality-checker operator checks one of: a record-level policy, and a task-level policy.

10. An apparatus, comprising:
    one or more processors;
    memory; and
    a program module, wherein the program module is stored in the memory and, during operation of the apparatus, is executed by the one or more processors to ingest data from a source in a set of sources, the program module including:
        instructions for accessing predefined configuration instructions;
        instructions for generating a dynamic data-ingestion pipeline compatible with a Hadoop file system based on the predefined configuration instructions,
        wherein the dynamic data-ingestion pipeline includes a modular arrangement of operators from a set of operators that includes: an extraction operator for extracting the data of interest from the source, a converter operator for transforming the data, and a quality-checker operator for checking the transformed data;
        instructions for receiving the data from the source; and
        instructions for processing the data using the dynamic data-ingestion pipeline by:
            using the converter operator to transform the received data into a common format compatible with the Hadoop file system;
            wherein the data is processed in real-time as the data is received, without storing the data in memory for the purpose of subsequent ingestion processing, thereby reducing storage requirements on the memory.

11. The apparatus of claim 10, wherein the set of sources is compatible with one of: a database, a message broker, a distributed key-value storage system, a Simple Storage Service (S3) file system, a first file system on a first network accessible via HyperText Transfer Protocol, a second file system on a second network accessible via File Transfer Protocol, and a local file system.

12. The apparatus of claim 10, wherein the dynamic data-ingestion pipeline egresses the data to a sink in a set of sinks;
wherein the sink is compatible with the Hadoop file system; and
wherein the set of operators includes a writer operator for outputting the data to the sink.

13. The apparatus of claim 10, wherein the set of operators includes a publisher operator for outputting the data to an output directory.

14. The apparatus of claim 13, wherein the publisher operator outputs the data when all of the operators in the dynamic data-ingestion pipeline are successfully completed.

15. The apparatus of claim 13, wherein the publisher operator outputs the data when a subset of the operators in the dynamic data-ingestion pipeline is successfully completed.

16. The apparatus of claim 10, wherein the processing of the data using the dynamic data-ingestion pipeline is performed as a batch process.

17. The apparatus of claim 10, wherein the processing of the data using the dynamic data-ingestion pipeline involves parallel processing of workunits.

18. The apparatus of claim 10, wherein the quality-checker operator checks one of: a record-level policy, and a task-level policy.

19. A system, comprising:
a processing module comprising one or more processors and a non-transitory computer readable medium storing instructions that, when executed by the one or more processors, cause the system to:
access predefined configuration instructions;
generate a dynamic data-ingestion pipeline compatible with a Hadoop file system based on the predefined configuration instructions, wherein the dynamic data-ingestion pipeline includes a modular arrangement of operators from a set of operators that includes: an extraction operator for extracting the data of interest from the source, a converter operator for transforming the data, and a quality-checker operator for checking the transformed data;
receive the data from a source in a set of sources; and
process the data using the dynamic data-ingestion pipeline by:
using the converter operator to transform the received data into a common format compatible with the Hadoop file system;
wherein the data is processed in real-time as the data is received, without storing the data in memory for the purpose of subsequent ingestion processing, thereby reducing storage requirements of the system.

20. The system of claim 19, wherein the dynamic data-ingestion pipeline egresses the data to a sink in a set of sinks;
wherein the sink is compatible with the Hadoop file system; and
wherein the set of operators includes a writer operator for outputting the data to the sink.

* * * * *